(12) United States Patent
Firla

(10) Patent No.: US 9,080,632 B2
(45) Date of Patent: Jul. 14, 2015

(54) BEARING FOR A MOTOR VEHICLE

(71) Applicant: ContiTech Vibration Control GmbH, Hannover (DE)

(72) Inventor: Andreas Firla, Neustadt (DE)

(73) Assignee: ContiTech Vibration Control GmbH, Hannover (DE)

( * ) Notice: Subject to any disclaimer, the term of this patent is extended or adjusted under 35 U.S.C. 154(b) by 26 days.

(21) Appl. No.: 14/106,788

(22) Filed: Dec. 15, 2013

(65) Prior Publication Data

US 2014/0103588 A1    Apr. 17, 2014

Related U.S. Application Data

(63) Continuation of application No. PCT/EP2012/059940, filed on May 29, 2012.

(30) Foreign Application Priority Data

Jun. 15, 2011    (DE) .......................... 10 2011 051 069

(51) Int. Cl.
*F16F 1/38*    (2006.01)
*F16F 1/373*    (2006.01)

(52) U.S. Cl.
CPC . *F16F 1/38* (2013.01); *F16F 1/373* (2013.01); *F16F 1/3828* (2013.01); *F16F 1/3849* (2013.01)

(58) Field of Classification Search
CPC ......... F16F 1/38; F16F 1/3828; F16F 1/3842; F16F 13/14; F16F 13/1409; F16F 13/1427

USPC ..................................... 267/140–140.13, 292
See application file for complete search history.

(56) References Cited

U.S. PATENT DOCUMENTS

| | | | | |
|---|---|---|---|---|
| 4,958,811 A | * | 9/1990 | Brenner et al. | 267/140.12 |
| 5,560,593 A | * | 10/1996 | Hofmann et al. | 267/219 |
| 2012/0175831 A1 | * | 7/2012 | Kieffer | 267/292 |

FOREIGN PATENT DOCUMENTS

| | | |
|---|---|---|
| DE | 27 55 117 A1 | 6/1979 |
| DE | 10 2009 044 093 A1 | 3/2011 |
| FR | 2 769 962 A1 | 4/1999 |

OTHER PUBLICATIONS

International Search Report dated Aug. 30, 2012 of international application PCT/EP2012/059940 on which this application is based.

* cited by examiner

*Primary Examiner* — Vishal Sahni
(74) *Attorney, Agent, or Firm* — Walter Ottesen P.A.

(57) ABSTRACT

A bearing for a motor vehicle has an inner part and an outer part which surrounds the inner part. An elastomer body connects the inner part and the outer part to one another by at least one spring leg which is provided substantially below the inner part in the direction of the weight force (G). A plug-in holder is at least partially received by the inner part. The inner part has a cutout on one side filled at least in some regions with an elastomer material. The plug-in holder has a stop opposite the cutout. The stop presses the elastomer material of the cutout against the outer part.

5 Claims, 4 Drawing Sheets

BEARING FOR A MOTOR VEHICLE

CROSS REFERENCE TO RELATED APPLICATIONS

This application is a continuation application of international patent application PCT/EP2012/059940, filed May 29, 2012, designating the United States and claiming priority from German application 10 2011 051 069.9, filed Jun. 15, 2011, and the entire content of both applications is incorporated herein by reference.

FIELD OF THE INVENTION

The invention relates to a bearing for a motor vehicle, having an inner part, an outer part which surrounds the inner part, an elastomer body which connects the inner part and the outer part together via at least one spring strut which is provided substantially below the inner part in the direction of the weight force, and a plug-in holder which is provided to be received at least partially by the inner part.

BACKGROUND OF THE INVENTION

Bearings of this type are already known from the prior art and are used in a motor vehicle, for example, for mounting the engine. Usually, the outer part is formed, for example, in a cylindrical or sleeve-like manner and the elastomer body has at least one spring strut, preferably at least two spring struts, which connect the for example sleeve-like inner part to the outer part. The use of two spring struts on which the inner part is mounted in the direction of gravitational force has the advantage that as a result better transverse stiffness can be achieved than with just one spring strut, which would operate as a pressure buffer. Also, two spring struts subjected substantially to shearing force are advantageous in order to generate a linear force-line path.

The spring strut is or the spring struts are provided substantially below the inner part in the direction of the weight force and thus substantially in the radial direction of the inner part and outer part, that is, in the plane perpendicular to the direction of insertion (longitudinal axis) of the plug-in holder. However, other geometric designs of the bearing are likewise possible.

The inner part contains an insertion opening into which a plug-in holder can be inserted in the axial direction of the bearing (longitudinal axis). For example, the engine of a motor vehicle can be secured to the plug-in holder such that, in the case of a bearing installed in a motor vehicle, the weight force of the engine is perpendicular to the longitudinal axis of the bearing, the longitudinal axis extending in the axial direction of the outer part. The engine of the motor vehicle is then mounted resiliently in the radial direction by the spring struts of the elastomer body.

During the production of such bearings, a gap is generally necessary in molding terms, this gap being enlarged even further by the shrinkage of the elastomer material of the elastomer body during the cooling process. If, when the bearing is employed in the motor vehicle, the spring struts are compressed in the direction of gravitational force because of the weight force of the vehicle components mounted on the plug-in holder, then the air gap is further enlarged in the radial direction (that is, counter to the direction of gravitational force) above the inner part with respect to the outer part. However, this air gap reduces the service life of the elastomer body and influences the force-travel characteristic of the bearing.

It has been shown that the service life of the elastomer body and thus of the entire bearing can be considerably increased if the elastomer body is preloaded in the radial direction such that the supporting spring struts are subjected to compressive stress. This is because, as a result of the preload, the radial spring travel which the spring struts permit is limited at least in the direction of tension. For this purpose, the spring travel which the spring struts allow is limited by stops in the elastomer body.

This can take place by way of additional elastomer and/or thermoplastic and/or metal components which are introduced into the air gap in order as a result to configure the progression of the spring struts in the tension direction. Thus, a preload can be created by a stop which is arranged between the inner part and the outer part of the bearing such that the elastomer body of the bearing is preloaded. As a result of the introduction of the stop, preloading of the elastomer body can be reliably achieved. However, it should be noted that the introduction of the stop represents an additional working step which makes the production of the bearing more complicated and thus more expensive.

DE 10 2009 044 093 A1 discloses a bearing described initially herein, which has a stop buffer located on the outer part and the plug-in holder of which has a stop. If the plug-in holder is now pushed in the axial direction into the inner part, the stop thereof presses radially against the stop buffer of the outer part and thus establishes a preload. As a result, a production step is saved since the plug-in holder and the stop are introduced together.

A disadvantage here is that the plug-in holder and stop are produced in one piece from the same material, for example cast aluminum, in order as a result to save a further production step which would be necessary in order to produce these elements separately and then assemble them. Thus, with the arrangement in DE 10 2009 044 093 A1, a very hard preload is achieved since this is brought about by a metal plug-in holder and stop. A further disadvantage is that the overall travel of the spring struts in the tension direction (this overall travel being determined by the spacing of the metal components) is reduced, and the stiffness rises sharply.

SUMMARY OF THE INVENTION

It is the object of the invention to provide a bearing of the type described above, which enables greater latitude in the production of the preload than in the case of the known bearings. At least an alternative possibility is intended to be provided for preloading a bearing of the type described at the outset and for setting or influencing the profile of the force-travel characteristic.

The bearing of the invention is for a motor vehicle. The bearing is subjected to a weight force (G) having a predetermined direction and includes: an inner part having a side defining a cutout; an outer part disposed in surrounding relationship to the inner part; an elastomer body defining a spring leg interconnecting the inner and outer parts; the spring leg arranged essentially underneath the inner part in the direction of the weight force (G); an insert holder configured to be at least partially accommodated in the inner part; elastomeric material filling at least regions of the cutout; the insert holder having a stop lying opposite the cutout; and, the stop being configured to press the elastomeric material against the outer member when the insert holder is accommodated in the inner part.

Thus, the invention relates to a bearing wherein the inner part has on one side a cutout which is filled at least regionally with an elastomer material, and the plug-in holder of which has a stop opposite the cutout, this stop being provided to press the elastomer material of the cutout against the outer part.

The invention is based on the insight of providing a cutout filled with elastomer material in the inner part of the bearing, and configuring the cutout such that this elastomer material is deformed by the stop of the plug-in holder such that, as a result of the interaction of the stop, elastomer material and outer part of the bearing, a preload in the radial direction and thus a desired progression in the tension direction of the bearing is set.

In this case, the configuration of the elastomer material in the cutout in combination with the design of the stop and of the inner side of the outer part, makes it possible to provide a soft adjusted progressive course. Thus, the geometry of the elastomer body and of the stop can be configured in a variety of ways to influence the progression. In particular, the width of the cutout filled with the elastomer material and the height of the elastomer material in this region come into consideration here. Also, the material properties of the elastomer material of the cutout can be used to influence the progression. This is not possible in such a way with known bearings such as those of DE 10 2009 044 093 A1, since a metal stop is used there.

Thus, service life problems of a bearing described initially herein can be avoided according to the invention by a corresponding travel limitation in the tension direction of the elastomer body and by a soft configuration of the course of the progression.

At the same time, the same production steps as in DE 10 2009 044 093 A1 are eliminated according to the invention, since the stop and plug-in holder are also introduced together in one working step.

According to one aspect of the invention, the plug-in holder and the stop are formed in one part. "One part" should be understood as meaning that the plug-in holder is produced as a whole, that is, at least the holding element, base and stop, from one piece, that is, solidly and without joining edges. It is advantageous here that a further production step of assembling the plug-in holder and stop prior to introduction into the inner part can be obviated.

According to a further aspect of the invention, the stop is in the form of a tongue-like protrusion. "Tongue-like" should be understood as meaning that the stop is formed in a manner extending substantially along the longitudinal axis of the plug-in holder or of the inner part, and is flattened in the front region in the introduction direction. As a result, the stop narrows in the introduction direction, with the result that it is easier to introduce the plug-in holder under the elastomer material of the cutout.

According to one aspect of the invention, the spring strut is provided in a mutually substantially radially opposite manner relative to the elastomer material and the stop. If two spring struts are present, these are provided in a mutually substantially radially opposite manner relative to the elastomer material and the stop. As a result, a preload in the direction of the weight force is achieved between the lower and upper inner side of the outer part.

According to a further aspect of the present invention, the elastomer material of the cutout and the elastomer material surrounding the elastomer material of the cutout have different Shore hardnesses. This can be realized for example by different elastomers or by a combination of plastics material, for example polyamide, and elastomer, for example rubber. It is advantageous in this case that the damping behavior of the bearing can be set in a versatile manner in this way. Thus, the elastomer material of the cutout can have different properties than the rest of the elastomer material surrounding the inner part and also than the material of the spring strut or spring struts. As a result, a high degree of freedom is created in the setting of the force-travel characteristic, in order to be able to optimally adapt the bearing to a large variety of requirements.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
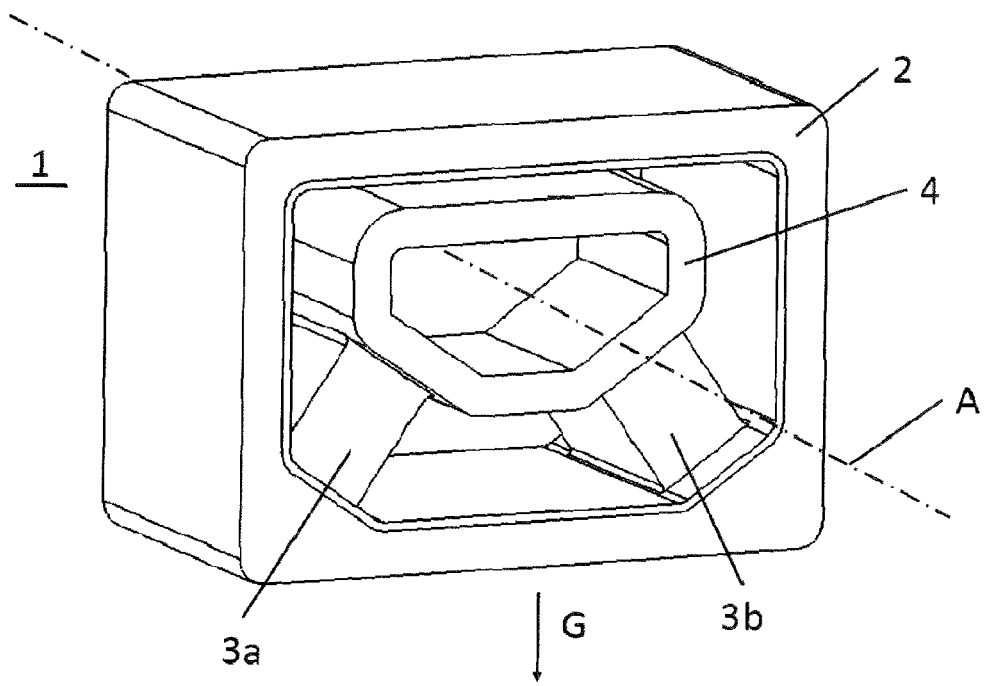
FIG. 1 shows a perspective schematic of a bearing without plug-in holder.

FIG. 1 shows a perspective schematic of a bearing 1 without plug-in holder 5. The bearing 1 has an outer part 2 which encloses an inner part 4. The two parts (2, 4) are oriented axially along the longitudinal axis A and spaced apart from one another radially, that is, in the plane perpendicular to the longitudinal axis A. In the case of a bearing 1 mounted in a motor vehicle, the longitudinal axis A is oriented substantially perpendicularly to the direction of the weight force G. The two parts (2, 4) have a hexagonal contour in this embodiment. However, it is also possible to use inner parts 4 and outer parts 2 having cylindrical, oval, rectangular or other polygonal contours.

Provided between the inner part 4 and the outer part 2 are two spring struts (3a, 3b) which connect the inner part 4 and the outer part 2 together in a resilient manner. Alternatively, it may also be possible to provide only one spring strut (not illustrated) which would then be provided preferably directly below the inner part 2 in the direction of the weight force G. The spring struts (3a, 3b) are provided preferably from an elastic material, with other types of resilient mounting also being possible. Preferably, the elastomer material of the spring struts (3a, 3b) is vulcanized as rubber between the inner part 4 and the outer part 2. The remaining region between the inner part 4 and outer part 2 is hollow, that is, free of material, in this embodiment, but further damping elements or other elements can also be provided between the inner part 4 and outer part 2.

Figure 2:
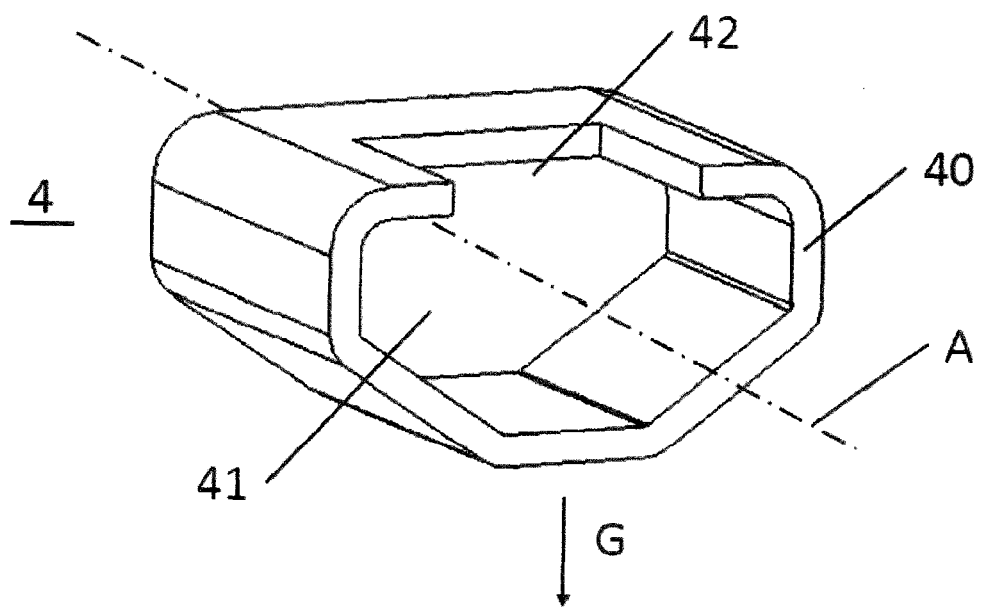
FIG. 2 is a perspective schematic of an inner part of a bearing without plug-in holder.

FIG. 2 shows a perspective schematic of an inner part 4 of a bearing 1 without plug-in holder 5. The inner part 4 has a sleeve-like inner body 40 which has a plug-in opening 41 for a plug-in holder 5 (see, for example, FIG. 3), which extends along the longitudinal axis A. The sleeve-like inner body 40 has a cutout 42 on its upper side, that is, that side facing counter to the weight force G. The cutout 42 is designed laterally (in the plane perpendicular to the weight force G) and over its depth (in the direction of the longitudinal axis A) to be at least as large as the stop 53 of a plug-in holder 5 (see, for example, FIG. 4) introduced into the plug-in opening 41. The cutout 42 is filled according to the invention with an elastomer material 43 (see, for example, FIGS. 5, 6 and 8) which, together with the stop 53 of the introduced plug-in holder 5, provides a preload with respect to the inner side of the outer part 2 (see, for example, FIGS. 5 and 8).

Figure 3:
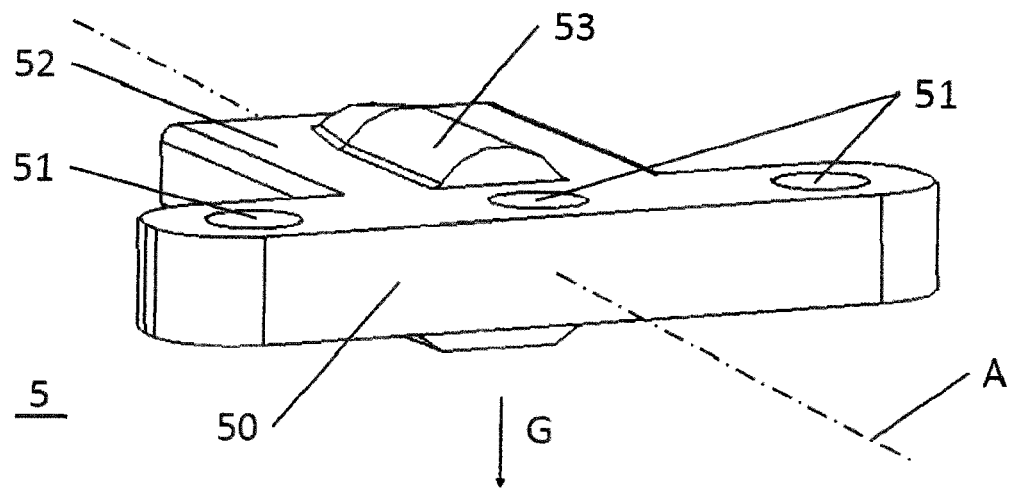
FIG. 3 shows a perspective schematic of a plug-in holder.

FIG. 3 shows a perspective schematic of a plug-in holder 5. The plug-in holder 5 has a holding element 50 with through-passage bores 51. The through-passage bores 51 extend substantially perpendicularly to the longitudinal axis A or in the direction of the weight force G and are used, in the installed state of the bearing 1, to secure a load, for example a transmission or an engine of a motor vehicle, to the bearing 1. The plug-in holder 5 also has a base 52 on the top side of which, that is, the side facing counter to the weight force G, a stop 53 is provided which is configured to be at most as large as the cutout 42 (see, for example, FIG. 2). The holding element 50, base 52 and stop 53 are in this case formed in one part (see for example also FIGS. 7 and 8).

Preferably, the stop 53 extends along the longitudinal axis A and has a front region which is flat in the insert direction (longitudinal axis A). This makes it easier to introduce the plug-in holder 5 into the plug-in opening 41 in the inner part 4, in that the flattened, front region of the stop 53 engages under the elastomer material 43 of the cutout 42 and lifts the material during the insertion, that is, counter to the direction of gravitational force G. In other words, the stop 53 is in the form of a tongue-like protrusion. This flattening ensures that the stop 53 does not bump against the elastomer material 43, that is, does not collide with the latter during insertion, which would result in the insertion being at least impeded and delayed. Thus, a time delay during the mounting of the plug-in holder 5 and inner part 4 can be avoided.

Figure 4:
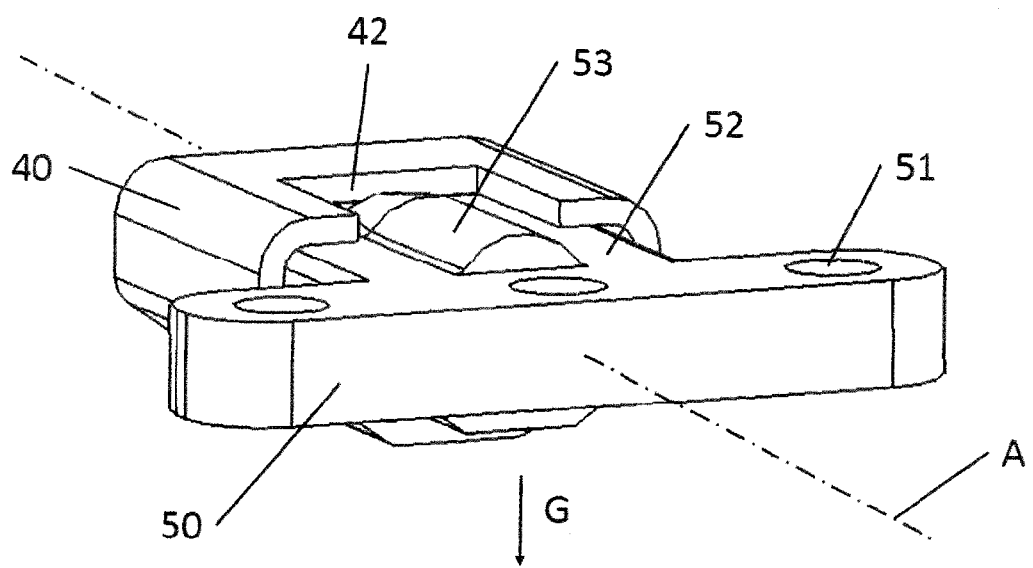
FIG. 4 shows a perspective schematic of an inner part of a bearing with inserted plug-in holder.

FIG. 4 shows a perspective schematic of an inner part 4 of a bearing 1 with introduced plug-in holder 5. The plug-in holder 5 has in this case been introduced along the entire longitudinal axis A into the plug-in opening 41 in the inner part 4. As a result, the base 52 having the stop 53 is largely enclosed by the sleeve-like inner body 40 such that the stop 53 is positioned in the cutout 42. In this case, FIG. 4 shows this constellation without the elastic material 43 in the cutout 42 in order to clarify the position and design of the stop 53 and cutout 42.

Figure 5:
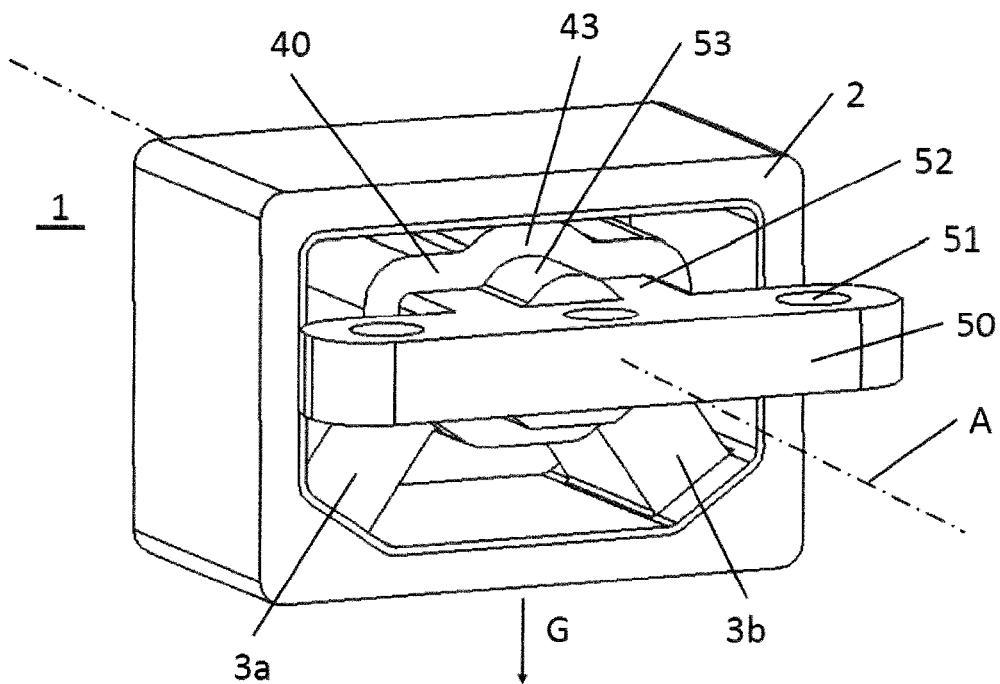
FIG. 5 shows a perspective schematic of a bearing with inserted plug-in holder.

FIG. 5 shows a perspective schematic of a bearing 1 with introduced plug-in holder 5. As has already been described with reference to FIG. 4, the stop 53 is positioned in the cutout 42 in the introduced state. If the cutout 42 is now filled according to the invention with the elastomer material 43, the elastomer material 43 is pushed from below, that is, counter to the direction of the weight force G, against the inner side of the outer part 2 by the introduced stop 53. As a result, a preload is achieved, the progression of which can be set or at least influenced by the dimensioning of the cutout 42 and stop 53 and the material properties of the elastomer material 43.

Figure 6:
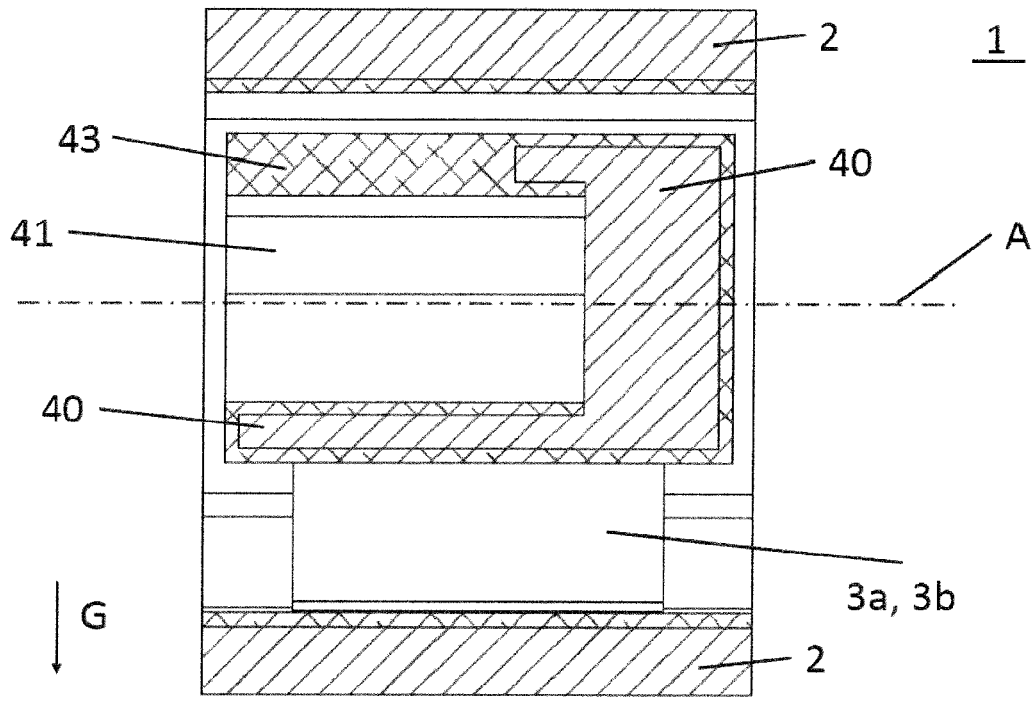
FIG. 6 shows a sectional view of a bearing without plug-in holder.

FIG. 6 shows a sectional view of a bearing 1 without plug-in holder 5. The inner part 4 is mounted resiliently on the two spring struts (3a, 3b) on the outer part 2. The inner part 4 has the plug-in opening 41 in the direction of the longitudinal axis A. The inner part 4 is configured in a cup-like manner in this view, that is, the sleeve-like inner body 40 has, in the right-hand region of FIG. 6, a bottom in the plane perpendicular to the longitudinal axis A, the base 52 of the plug-in holder 5 resting against this bottom in the introduced state. The sleeve-like inner body 40 is virtually completely covered with an elastomer layer in this embodiment. This elastomer layer is formed as an elastomer material 43 in the region of the cutout 42 (see, for example, FIGS. 2 and 4) such that the elastomer material 43 at least completely fills the cutout 42 over its height (axis of the weight force G). However, it is also possible to provide the elastomer material 43 of the cutout 42 with a smaller height or thickness than the sleeve-like inner body 40 or with a greater height or thickness in order as a result to influence the preload or the progression.

Figure 7:
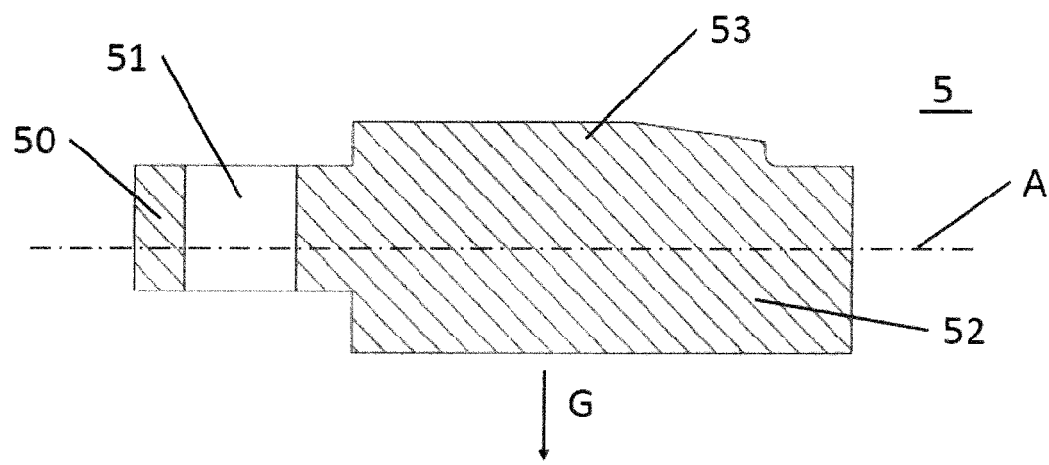
FIG. 7 shows a sectional view of a plug-in holder.

FIG. 7 shows a sectional view of a plug-in holder 5. The elements of the plug-in holder 5 of FIG. 7 correspond to those in the illustration in FIG. 3.

Figure 8:
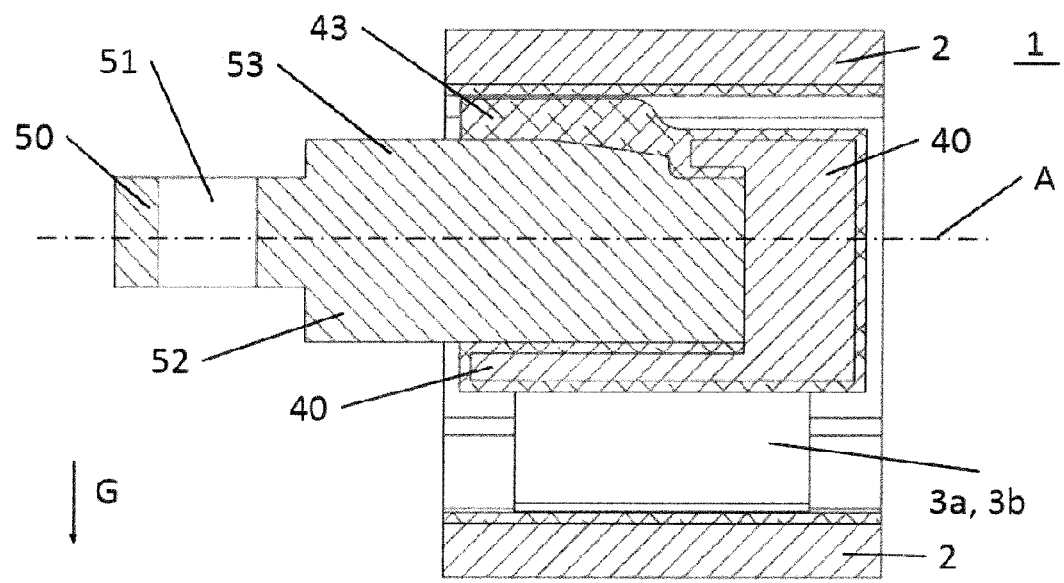
FIG. 8 shows a sectional view of a bearing with inserted plug-in holder.

FIG. 8 shows a sectional view of a bearing 1 with introduced plug-in holder 5. On its underside, that is, its horizontal plane in the direction of gravitational force G, the plug-in holder 5 having the base 52 rests on the lower inner region, coated with elastomer material, of the sleeve-like inner body 40. In the right-hand region of FIG. 8, the base 52 rests against the bottom of the sleeve-like inner body 40. Compared with FIG. 6, the region of the elastomer material 43 is pushed upwardly, that is, counter to the direction of the weight force G, against the inner side of the outer part 2 by the stop 53 of the introduced plug-in holder 5, with the result that the desired preload can be set according to the invention.

It is understood that the foregoing description is that of the preferred embodiments of the invention and that various changes and modifications may be made thereto without departing from the spirit and scope of the invention as defined in the appended claims.

LIST OF REFERENCE NUMERALS (Part of the description)
1 Bearing
2 Outer part
3a First spring strut
3b Second spring strut
4 Inner part
40 Sleeve-like inner body
41 Plug-in opening for plug-in holder 5
42 Cutout for elastomer material 43
43 Elastomer material in cutout 42
5 Plug-in holder
50 Holding element
51 Through-passage bores
52 Base
53 Stop
A Longitudinal axis
G Direction of the weight force

What is claimed is:

1. A bearing for a motor vehicle, the bearing being subjected to a weight force (G) having a predetermined direction and comprising:
    an inner part having a side defining a cutout;
    an outer part disposed in surrounding relationship to said inner part;
    an elastomer body defining a spring leg interconnecting said inner and outer parts;
    said spring leg arranged essentially underneath said inner part in the direction of said weight force (G);
    an insert holder configured to be at least partially accommodated in said inner part;
    elastomeric material filling at least regions of said cutout;
    said insert holder having a stop lying opposite said cutout; and,
    said stop being configured to press said elastomeric material against said outer part when said insert holder is accommodated in said inner part.

2. The bearing of claim 1, wherein said insert holder and said stop thereof are configured as a single piece.

3. The bearing of claim 1, wherein said stop is configured as a tongue-shaped projection.

4. The bearing of claim 1, wherein said spring leg lies essentially opposite relative to both said elastomeric material and said stop.

5. The bearing of claim 1, wherein said elastomeric material filling at least regions of said cutout is a first elastomeric material; and, said bearing comprises a second elastomeric material surrounding said first elastomeric material; and, said first and second elastomeric materials have respectively different Shore hardnesses.

* * * * *